No. 79.
S. F. B. MORSE.
REISSUED JAN. 15, 1846.
MODE OF COMMUNICATING INFORMATION BY SIGNALS BY THE APPLICATION OF ELECTROMAGNETISM.
NO MODEL.
4 SHEETS—SHEET 1.
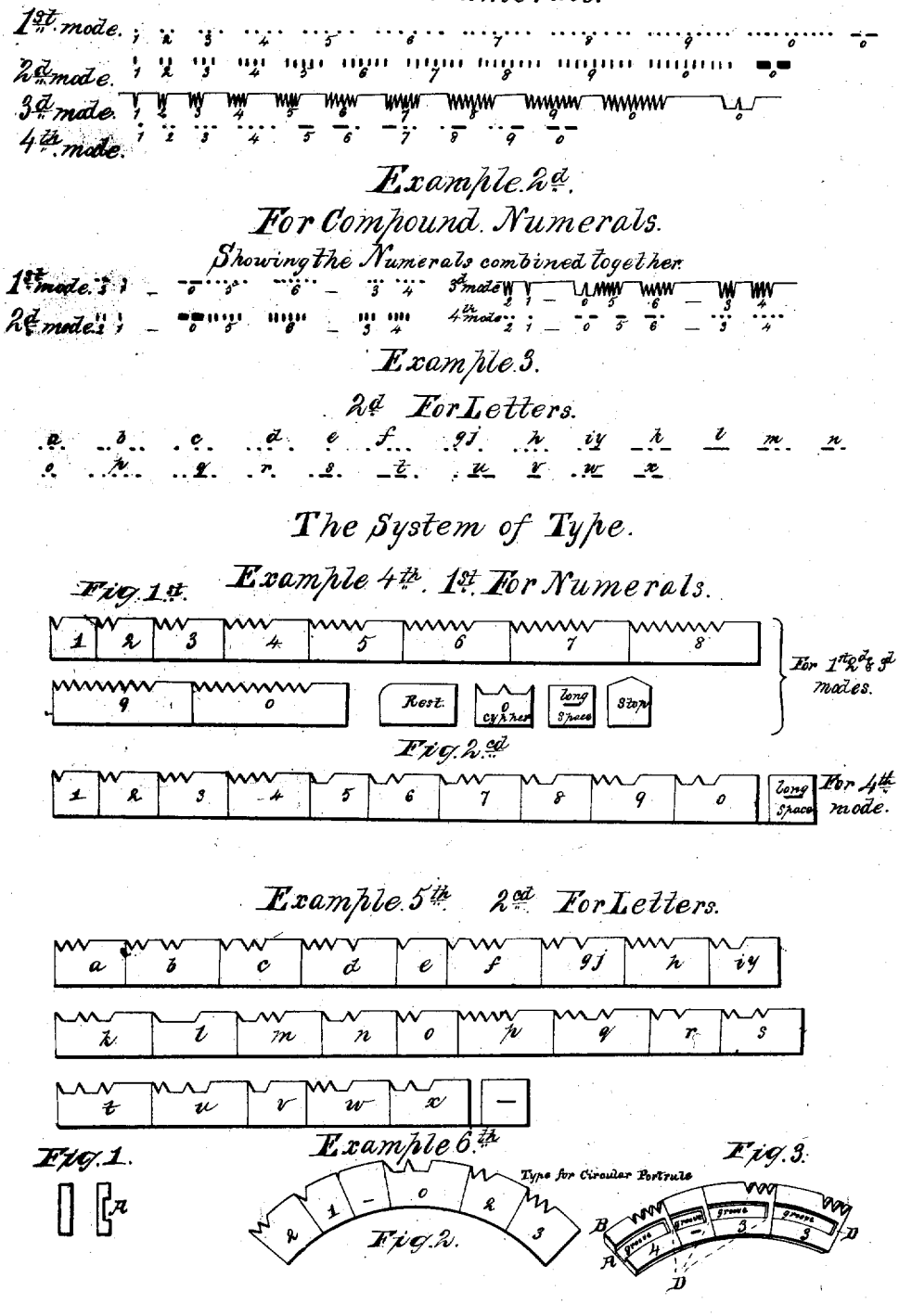

No. 79. REISSUED JAN. 15, 1846.

S. F. B. MORSE.

MODE OF COMMUNICATING INFORMATION BY SIGNALS BY THE APPLICATION OF ELECTROMAGNETISM.

NO MODEL. 4 SHEETS—SHEET 2.

Example. 10.

Birds eye View.

Train of wheels.

Side View

Side View

No. 79. REISSUED JAN. 15, 1846.
S. F. B. MORSE.
MODE OF COMMUNICATING INFORMATION BY SIGNALS BY THE APPLICATION OF ELECTROMAGNETISM.
NO MODEL. 4 SHEETS—SHEET 3.
Example 7. Type Rule.
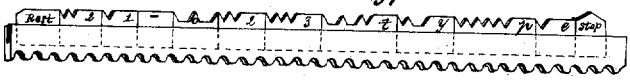
Example 8th Straight Port-rule.
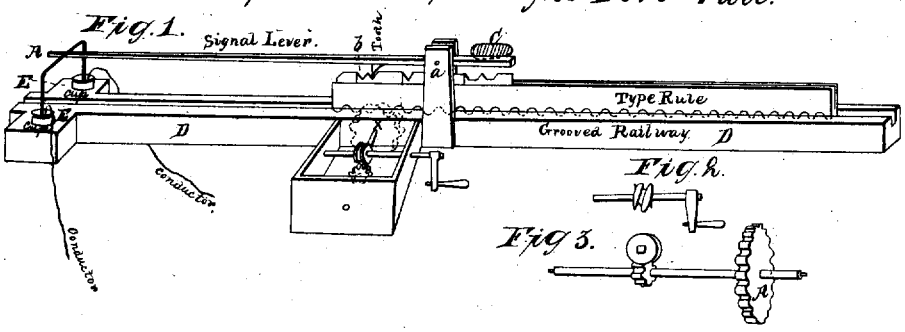
Example 9th Circular Port-rule.
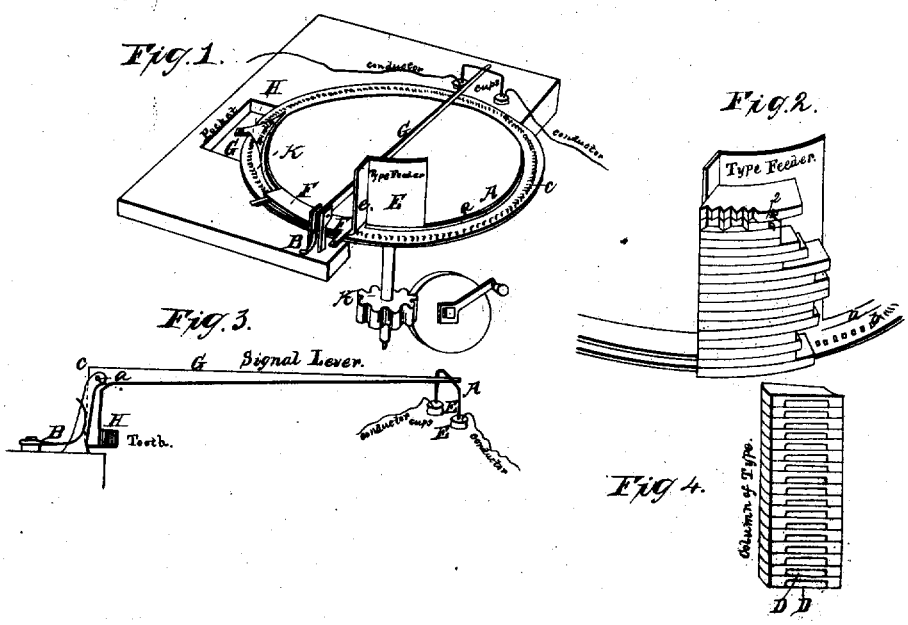

No. 79. REISSUED JAN. 15, 1846.
S. F. B. MORSE.
MODE OF COMMUNICATING INFORMATION BY SIGNALS BY THE APPLICATION OF ELECTROMAGNETISM.
NO MODEL. 4 SHEETS—SHEET 4
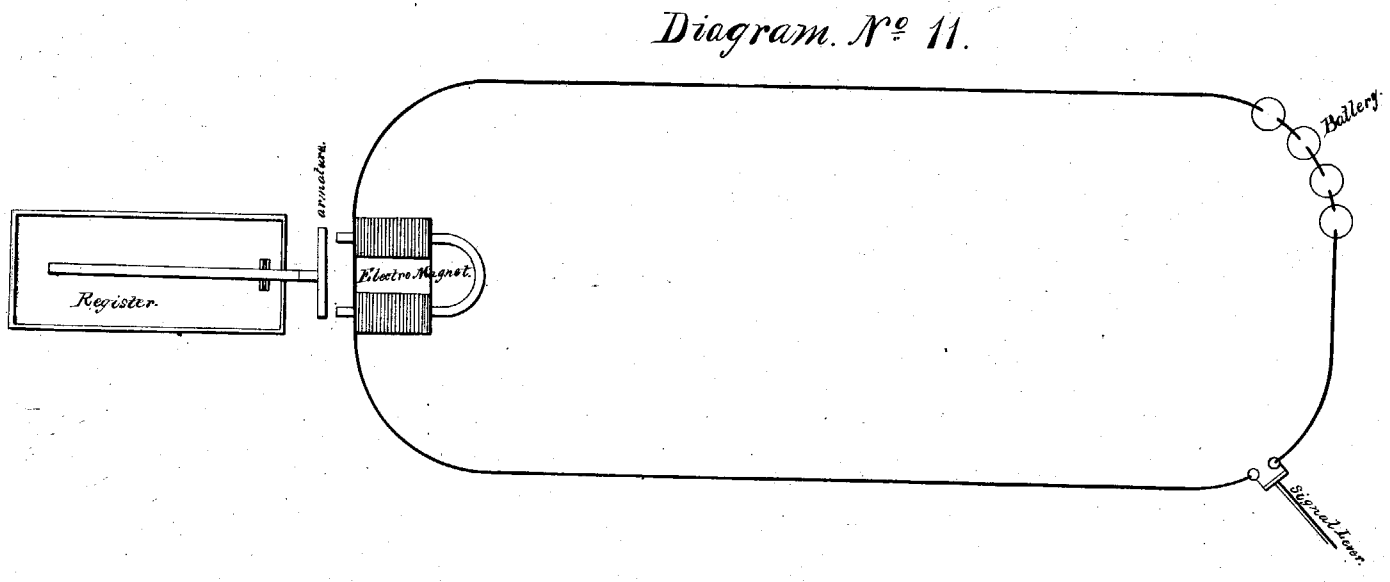

UNITED STATES PATENT OFFICE.

SAML. F. B. MORSE, OF NEW YORK, N. Y.

IMPROVEMENT IN THE MODE OF COMMUNICATING INFORMATION BY SIGNALS BY THE APPLICATION OF ELECTRO-MAGNETISM.

Specification forming part of Letters Patent No. 1,647, dated June 20, 1840; Reissue No. 79, dated January 15, 1846.

*To all whom it may concern:*

Be it known that I, SAMUEL F. B. MORSE, of the city, county, and State of New York, have invented a new and useful apparatus for and system of transmitting intelligence between distant points by means of electro-magnets, which put in motion machinery for producing sounds or signs and recording said signs upon paper or other suitable material, which invention I denominate the "American Electro-Magnetic Telegraph;" and I do hereby declare that the following is a full, clear, and exact description of the principle or character thereof which distinguishes it from all other telegraphs previously known, and of the manner of making and constructing said apparatus and applying said system, reference being had to the accompanying drawings, making part of this specification, in which—

Figure 1:
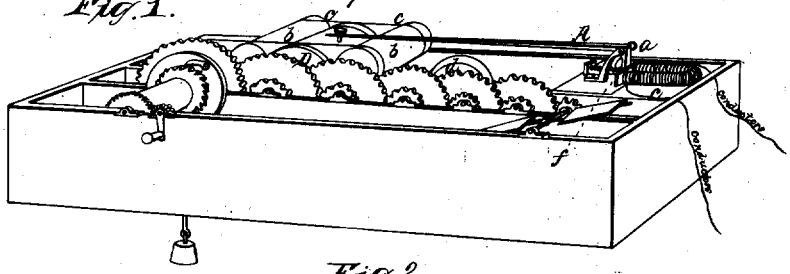
Figure 2:
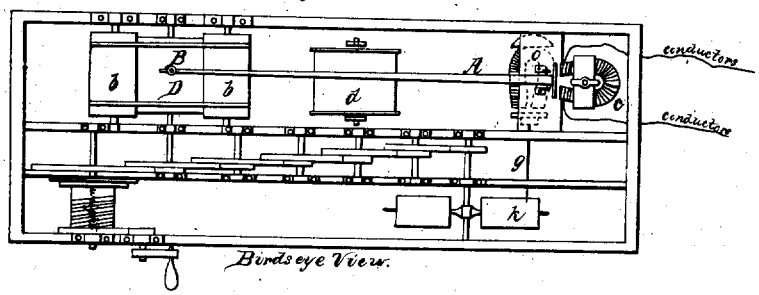
Figure 3:
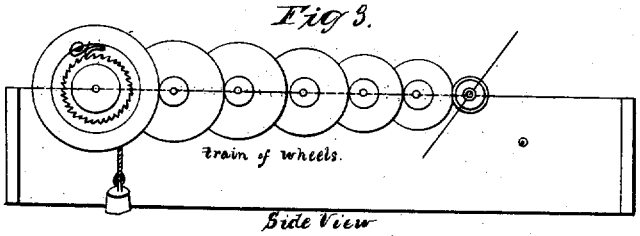
Figure 4:
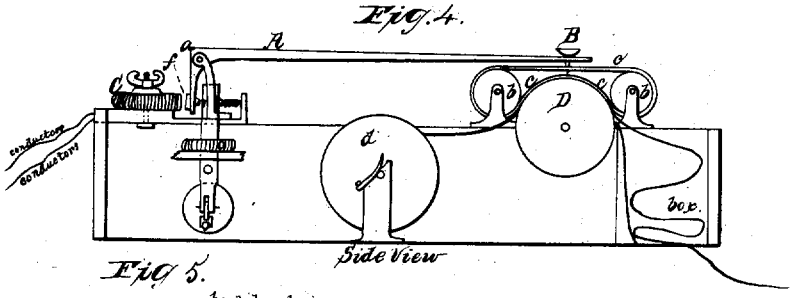
Figure 5:
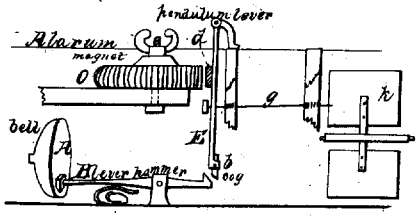

Example 1 is a sample of signs intended for numerals; Example 2, signs for compound numerals. Example 3 are signs for letters, and Examples 4, 5, and 6 are specimens of the form of types used. Example 7 is the type-rule; Example 8, apparatus for connecting and breaking the electrical or galvanic circuit. Example 9 is a modified apparatus for the same purpose. Example 10, Figure 1, is a perspective view of the registering apparatus; Fig. 2, a top plan; Fig. 3, a side elevation of the train of wheels for moving the paper and regulating its motion; Fig. 4, a sectional elevation of the registering-lever and parts appended thereto; Fig. 5, alarm apparatus; Example 11, a diagram showing the relative positions of the different parts of an approved form of apparatus.

It has heretofore been essayed to use the currents of electricity or galvanism for telegraphic purposes either by decomposition or the action or exercise of the deflective force of a current upon a magnetized bar or needle, which decomposition or deflection required to be noted by occular inspection at the instant the sign was made.

By my invention the intelligence can be transmitted and imprinted on paper or other suitable substance without requiring the aid of any person at the station to which the communication is transmitted, so as to be read at any time thereafter.

The apparatus consists of two principal parts connected by wires, as shown in the Diagram No. 11, or other suitable galvanic or electric conductors to form a circuit, in which is placed any suitable generator of galvanism or electricity as the inducing power.

The first part of my telegraph is for communicating intelligence to the second, where it is recorded; and it consists of apparatus for making and breaking the circuit above named. At any convenient point in the circuit (generally near the generator) a break is made in the conductor, and the two ends thereof are immersed in mercury-cups, as shown in the drawings at E E, Fig. 1, Example 8. To correct the circuit I employ an inverted V-formed piece of metal or other proper conductor, A, suspended over the mercury-cups E E on the end of a horizontal lever, denominated in said drawing the "signal-lever," whose fulcrum is at *a*, so that when the connector A is dipped into the cups the circuit is completed. Between the fulcrum and connector A there is affixed to the under side of the lever, and projecting downward, a triangular tooth, *b*, which bears on the upper surface of the types about to be described, and is raised and lowered by them. The lever may be counterbalanced, as at C, to make it move easy. The types are composed of flat straight strips of metal, as shown in Examples 4 and 5 of the drawings, hereunto annexed, having their upper edges indented to suit the character to be represented, and which will be hereinafter more fully set forth in the description of the operation of the machine. The indentations are sufficiently deep to allow the connector A to be plunged into the mercury-cups, and the highest surface raises it from them. It is obvious that the forms of the upper surface of the types may be reversed and the cog *b* placed on the other side of the fulcrum, and the same effect be produced. The types are set up and confined in a rule to form any required sentences in one long line. This rule, which in the drawings, Example 8, is denominated a "type-rule," has on its under side a rack that gears into a pinion, *x*, on a shaft under the grooved railways D, of common construction, on which said rule slides, and is directed under the cog *b* on the lever. The types are advanced at a regular speed by the application of any convenient power to the pinion *x* and bring notches in them successively under the cog.

Other modifications of this apparatus can be made, some of which are shown in the drawings, Example 9, in which is represented what I denominate a "circular post-rule," in which the type are made to surround a disk, A, radially, the other parts of the apparatus being made to correspond. In this modification there may be a stationary hopper or type-feeder, E, into which the types are placed flatwise, one above another, as shown at Fig. 2, placed over the space that is to receive the types on the disk A, and as the disk revolves the types placed in the feeder fall successively into place on the disk and are carried past the signal-lever, where they act, and are then carried off from the disk by a guide, H, into a receiver, G. Many other devices have been suggested for effecting the same object—viz., making and breaking the circuit; but I believe these examples will illustrate the principle. The mercury-cups may be dispensed with and suitable metal plates substituted therefor.

The second part of my apparatus is for registering the signals or sentences communicated from the station where the apparatus heretofore described is situated; and it consists of an electro-magnet, which is in and connected with the above-described circuit, and clock-work for moving the paper or other registering medium, and an alarm may also be appended. The electro-magnet may be of any convenient construction, and will be charged every time the circuit is closed, as above, and discharged when it is broken. Opposite the bars of the electro-magnet (Example 10) C is placed an armature, *f*, suspended on the upright arm of a bent lever, A, the fulcrum of which is at *a*. This is most clearly represented in section, Fig. 4. To the end of the horizontal arm of this lever there is attached one or more pencils, fountain-pens, or other suitable marking-instruments, directly under which is placed a suitable cylinder, D, over which the paper passes on which the register is made. This cylinder turns on its axis, and is connected by a train of wheels and pinions with a barrel, *m*, of common construction, which is driven by a weight and cord wound thereon, and also with a fly, *k*, which regulates its motion. Near the cylinder D a reel or spool, *d*, is placed, on which a strip of paper is wound, the end of which is carried over the cylinder D, and is confined thereon by means of two tapes or endless bands, one at each edge, which pass around two pulleys, *b b*, one on each side of cylinder D. This is clearly represented in Figs. 2 and 4. By this arrangement it will be seen that when the electro-magnet is charged the marking-instrument will be brought down onto the paper, which is at the same time put in motion by removing a wire, *g*, which is so connected with the armature that it can be drawn back from the fly *k*, and allow it to turn, (see Figs. 4 and 5,) and makes a mark, longer or shorter, according to the time the circuit is closed.

My system of characters consists of dots and lines, variously combined to form letters and other characters, a specimen of which is represented in Examples 1, 2, and 3. To make a dot a notch is required in the types, into which the cog on the signal-lever will fall and instantly rise from as the type moves on; and when a line is to be formed the notch in the type is extended, so that the lever will remain down for a space of time sufficient to make the line required.

The alarm-bell (shown at A, Example 10, Fig. 5) is struck by means of a hammer actuated by a supplementary electro-magnet placed in the same circuit as that first named. The machinery for thus purpose may be variously modified, and therefore no particular description need be given.

Any convenient number of registering-stations may be connected with the same circuit, all constructed and operating as above described.

To extend more effectually the communication by my apparatus, I adopt the following arrangement, whereby I can use any number of additional batteries or generators of said current, and by which I can connect progressively any number of consecutive circuits, viz: I place at any point in the first circuit an electro-magnet, with an armature opposite, on a lever like that described for registering; but instead of the marking-instrument I attach to the end of the lever a conductor, such as is described on the first or signal lever. This connects the conductors of a new circuit, attached to another battery, and this might be continued on *ad infinitum*.

The conductors may be insulated in any convenient way, and may be extended above or below the surface of the earth, as shall be found most desirable, and sustained or inclosed by any suitable construction.

It will be observed that any vocabulary, system of signs, or secret writing by cipher can be conveniently used in communicating by this telegraph, and any mode of making or breaking the circuit can be adopted, the object being to do so at proper intervals.

Having thus fully described my invention, I wish it to be understood that I do not claim the use of the galvanic current or currents of electricity for the purpose of telegraphic communication; but

What I specially claim as my invention and improvement is—

1. Making use of the motive power of magnetism when developed by the action of such current or currents, as a means of operating or giving motion to machinery, which may be used to imprint signals upon paper or other suitable material or to produce sounds in any desired manner for the purpose of telegraphic communication. (The only ways in which the galvanic current has heretofore been proposed to be used is by decomposition and the action or exercise of the deflective force of a current upon a magnetized bar or needle, and the decompositions and deflections thus produced were the subject of inspection, and had no power of recording the communication. I therefore characterize my invention as the first recording or printing telegraph by means of electro-magnetism. There are various known modes of producing motions by electro-magnetism, but none of these have hitherto been applied to actuate or give motion to printing or recording machinery, which is the chief point of my invention and improvement.)

2. The system of signs consisting of dots and lines, substantially as herein set forth and illustrated, in combination with the telegraph for recording signals.

3. The types and rule, in combination with the signal-levers, as herein described, for the purpose of connecting and breaking the current of galvanism and electricity.

4. In combination with an electro-magnet used for telegraphic purposes, the train of clock-work actuated by a weight or spring for the purpose of carrying the material on which the record is to be made under the registering-pen, substantially in the manner specified.

5. The combination of two or more circuits of galvanism or electricity generated by independent batteries by means of electro-magnets, as above described.

In testimony whereof I have hereunto subscribed my name, this 27th day of December, 1845, to the above amended specification of the invention for which Letters Patent were granted to me on the 20th day of June, 1840.

SAML. F. B. MORSE.

Witnesses:

JAMES MACGREGOR, Jr.,
A. P. BROWNE.